United States Patent [19]

Lundquist, Jr. et al.

[11] 3,957,506
[45] May 18, 1976

[54] CATALYTIC WATER TREATMENT TO RECOVER METAL VALUE

[75] Inventors: Joseph Theodore Lundquist, Jr., Ellicott City; James Michael Maselli, Columbia; Dillard Glenn Whitt, Highland, all of Md.

[73] Assignee: W. R. Grace & Co., New York, N.Y.

[22] Filed: Sept. 11, 1974

[21] Appl. No.: 504,466

[52] U.S. Cl............................. 75/108; 75/101 BE; 75/109; 75/117; 75/118 R; 423/25
[51] Int. Cl.²................ C22B 11/04; C22B 15/12
[58] Field of Search............... 75/101 BE, 108, 106, 75/109, 118, 117, .5 A; 423/25

[56] References Cited
UNITED STATES PATENTS

| | | | |
|---|---|---|---|
| 1,509,156 | 9/1924 | Lawry | 75/106 |
| 3,294,483 | 12/1966 | Hirschberg | 75/108 X |
| 3,321,303 | 5/1967 | Roberts | 75/106 |
| 3,666,447 | 5/1972 | Saubestre | 75/108 |

*Primary Examiner*—G. Ozaki

[57] ABSTRACT

A novel continuous reduction process is disclosed for recovering values of metals having a more positive reduction potential than hydrogen from an aqeuous solution. The process includes the steps of contacting the aqueous solution containing metal value in a reactor with a metal catalyst consisting essentially of Pt or Pd metal dispersed on an inert catalyst support in the presence of a stoichiometric excess of hydrogen substantially dissolved in the aqueous solution to reduce the metal value and deposit free metal on the catalyst, and separating recovered metal value from the catalyst.

The catalyst support may comprise electrically conductive particles. In the preferred embodiments, the catalyst consists essentially of about 0.02 to 1 Wt % Pt on a porous carbon support and the aqueous solution contains gold or copper values. The process may be conducted co-currently in a fixed catalyst bed reactor with the solution containing metal values and dissolved hydrogen flowing upwardly through the catalyst bed at ambient temperature, while maintaining hydrogen partial pressure at least as great as 1 atmosphere.

The process is especially valuable for recovering metals from dilute aqueous solution, typically in a concentration of about 0.1 to 100 ppm. Recovery in excess of 90% is obtainable.

3 Claims, 2 Drawing Figures

CATALYTIC WATER TREATMENT TO RECOVER METAL VALUE

BACKGROUND OF THE INVENTION

This invention relates to recovery of metals from solution. In particular it describes a novel process for reducing metal ions with hydrogen in a particulate bed-contactor.

Various methods, such as electrolysis and cementation, exist for recovering or precipitating metal values from ionic solution in various industries. Particular difficulty is encountered in recovering valuable metals from very dilute solutions. Plating or rinse solutions containing a few parts per million of palladium, gold, silver, or other metals are discarded without recovering the metals, resulting in monetary loss and environmental water pollution.

SUMMARY

It is an object of this invention to provide apparatus, catalysts and operating metals by contacting an acidic or basic solution containing the metals in ionic form with excess catalyzed hydrogen. The hydrogen reducing gas is substantially completely dissolved in the feedstream before contacting an active Pt or Pd catalyst in a packed bed of the catalyst on a suitable substrate. These and other objects and advantages of the invention will become apparent to one skilled in the art upon reading the following description and by reference to the drawing.

THE DRAWING

FIG. 1 is a rectilinear plot of percent recovery vs time for reduced metal values in solutions treated according to this invention; and FIG. 2 is a plot similar to FIG. 1.

DESCRIPTION OF THE PREFERRED EMBODIMENTS

Figure 1:
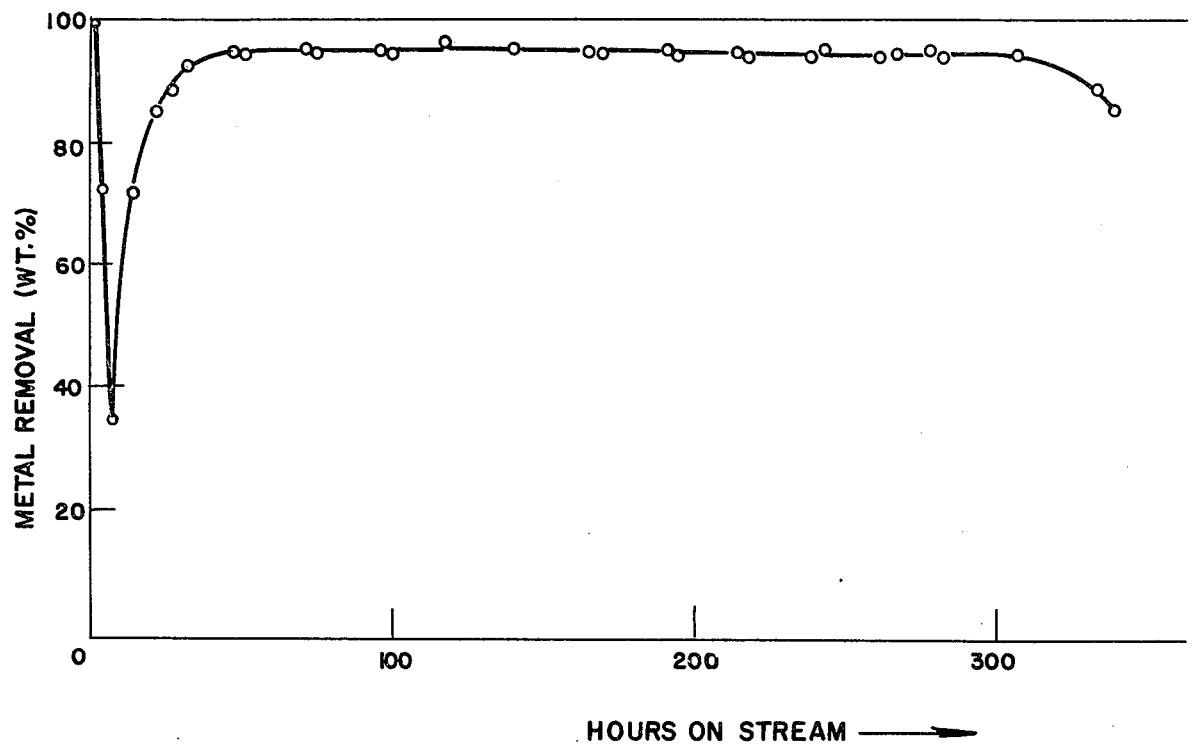

In the following description, various representative examples of the invention are set forth to enable one skilled in the hydrometallurgical and chemical arts to practice the invention. Unless otherwise stated, metric units are employed throughout, proportions are given on a weight basis, ambient temperature conditions are maintained. Pressures are expressed in atmospheres (absolute).

Recycle of treated water is especially valuable in the economical recovering of metal values from dilute aqueous solutions, such as plating rinse waters. Cascade rinse water systems, such as disclosed in U.S. Pat. No. 3,556,970 may be treated catalytically with recycle of purified water to the clean rinse tank and recovery of metallic species.

The reactor employed herein may be a rigid polymer or glasslined steel vessel sufficient to withstand up to 5-6 atmospheres pressure and inert to the aqueous feedstream. A closed contactor vessel is provided with means for receiving the feedstream at the bottom of a packed catalyst bed and means for withdrawing treated water. The catalyst bed may be packed at a macroporosity of 30-50 volume %, with typically about 35% void volume.

A suitable dissolver for the gaseous hydrogen reducing agent is provided, such as an elongated inert tube, tank or counter-current packed bed, usually operated at a pressure greater than the contactor. Excess oxygen may be removed prior to the mixing of hydrogen by known means, for example a barometric leg as described in U.S. Pat. No. 3,344,584.

Liquid flow rate can be varied widely. A meaningful criterion for throughput of treated electrolyte is the volumetric ratio of solution per unit volume of the chemical reaction zone. In a packed cell with homogeneous flow, successful catalytic reactions can be carried to substantial completion in a single pass at flow rates greater than 100 ml/liter-minute. In a static bed the flow rate and residence time are adjusted to the particular reduction processes, and the liquid flow may be maintained in the laminar regime; however, turbulent flow may be desirable for some uses. Ordinarily, means is provided for flowing solution at a linear velocity of about 0.1 to 100 cm/sec., preferably about 1 to 10 cm/sec.; however, linear velocities of 0.01 to over 100 cm/sec. are feasible.

In order to conserve space and obtain complete treatment of treated solutions care may be taken in design of the reactor to maintain homogeneous flow conditions between the inlet and outlet.

The treated solution may be pre-conditioned chemically or filtered to remove any foreign matter which may be deleterious to the desired chemical reaction. Particulate matter tends to clog the porous bed and should be removed.

The pH of the solution to be treated may vary over a wide range, being either acidic, neutral or basic. Desirably, the pH range is from about 2 to 11. Depending upon the makeup of the solution which is to be treated, adjustment of the pH may be done by the addition of various acids, bases or salts to the solution. Suitable additives which may be used are aqueous solutions of borates, ammonia, sodium chloride, sulfuric acid, calcium chloride, sodium cyanide, chloroacetates, sodium hydroxide, sodium bicarbonate, hydrochloric acid, phosphates and the like. Preferred solutions to be treated have an electrical conductivity (K) of at least about $5 \times 10^{-5}$ (ohm-cm)$^{-1}$.

The temperature of the reaction may vary over a wide range, the only criteria being that at the temperature used the solution remain a liquid. Thus, temperatures within the range of about 0° to 100°C are suitable. For economy in operation it is preferred to utilize these solutions at ambient temperatures. Similarly, the pesent process is desirably carried out at atmospheric pressure although either sub- or super-atmospheric pressures may be employed if desired. It has been found that temperatures at 10-80°C are desirable in effecting a rapid catalytic reaction depending upon the particular solution, metallic species, pH range, type and concentration of chemical species. Because of its porous, conductive, and acid-base resistant properties, the preferred catalyst support material is carbon, e.g., graphite. Activated carbon in pellet, granular, spherical or other form about 2 mm in diameter and 5–10 mm in length, such as Norite RB-II. An average particle size from about $5\mu$ to $2000\mu$ is preferred with those particles between $50\mu$ and $1000\mu$ being optimum. Granular 12×40 mesh carbon (Westvaco Nuchar WV-G) is a preferred substrate. The beds can be homogeneous or different materials may be used. High surface area, e.g., about 1000 m²/gm is desirable. Other substrate particles employed to form the porous bed in the present process are solid, particulate materials that may be conductive, nonconductive or semi-conductive. The material of which the particles are made will normally have at least a surface conducting material. The particles may have an intermediate metallic layer made with non-conductive substrate on which a metallic surface has been deposited. Typical of the non-catalytic metals which may be employed are gold, copper, and the like. Various structural shapes are feasible for the catalyst support. Standard packing shapes include saddles, granules, foams, pellets, rashig rings, and spheroidal particles. Non-conducting substrates such as alumina, silica, etc., can be employed, especially where an electrically-conductive surface is provided. Ordinarily 0.02 to 1% free metal catalyst on carbon is sufficient to obtain substantially complete removal of heavy metals from dilute aqueous solution. Acid washed carbon particles are clad with the desired amount of catalyst solution and reduced by gaseous 5% $H_2/N_2$ at about 315°C. The catalysts may also be prepared according to the procedures described in U.S. Pat. Nos. 3,121,031, 3,147,154 or 3,294,483.

The amount of hydrogen to be provided should be in excess of that required for complete reaction of the metal ion. Where dissolved oxygen is present in he feed stream, the oxygen reacts catalytically with the dissolved hydrogen in preference to the desired metal. Therefore, the oxygen may be removed by degassing the feedstream, or suffient hydrogen may be employed to scavenge the oxygen and also catalytically reduce the metal value. Since reaction rate is a function of dissolved hydrogen concentration, the partial pressure of hydrogen should be maintained at least as great as 1 atmosphere to achieve efficient utilization of the reaction. Reactor pressure of 1–5 atmospheres is preferred.

The hydrogen reducing agent may be dissolved in the aqueous feedstream outside the reactor or it may be added in the reactor. The catalytic reaction obtained herein is effected by contacting substantially completely dissolved hydrogen with the catalytic surface. The concentration of catalytically activated hydrogen is dependent upon the amount of dissolved hydrogen, which increases with the pressure.

Catalyst loading capacity is also a linear function of hydrogen partial pressure.

Optimum conditions were obtained with contactors operated at 2–4 atmospheres pressure (absolute). Hydrogen may be generated electrochemically or added from available sources.

The present process is operable to remove those metals having a reduction potential in aqueous solution which is more positive than hydrogen in the electromotive series. In the standard displacement series the following elements are shown in standard order of increasing electrochemical activity: Au, Pt, Ir, Pd, Sb, Bi, As, Hg, Ag, Cu, H.

The above metals are more noble than hydrogen under the reaction conditions and display lower electrochemical activity.

The reactions herein are generally reversible under oxidizing conditions. For instance, gold is recovered according to the reaction $$Au(CN)_2^- + [H] \rightarrow Au° + 2 CN^- + H^+.$$

Excess cyanide and oxygen can reverse this reaction to solubilize deposited metals.

The accumulated metal may be separated from the catalyst by leaching under oxidation conditions or by burning the carbon substrate to leave a metallic residue.

EXAMPLE I

A platinized catalyst (0.1% Pt/C) on carbon pellets (Norit RB-II) is packed in a cylindrical vertical reactor. A feed rate of 160 ml min.$^{-1}$l$^{-1}$ is maintained for an aqueous solution containing 22 parts per million (ppm) gold as $Au(CN)_2^-$. The contactor is operated at 4.8 atmospheres pressure and room temperature.

Hydrogen is dissolved in the feedstream at a rate of 1.6 to 2.5 volumes (STP) of $H_2$ per 100 volumes of solution. After an initial start up period, the gold is recovered at a rate of more than 95% for the first 360 hours of operation, dropping to 90–91% removal at 480 hours, the termination point. The catalyst is loaded with 20 wt. % Au (about 3 Troy oz. Au/lb. of catalyst). Gold is deposited on the outer geometric surface of the catalyst, having a film thickness of about 1 to 5$\mu$, typically 2 to 3$\mu$. About 60% of the hydrogen is consumed in the reactor.

Approximately two-thirds of the total gold deposited is found in the half of the bed (adjacent the inlet).

EXAMPLE II

The procedure of Example I is repeated except the catalyst is a platinized 12–40 mesh granular carbon (Nuchar WV-G) having 0.045 wt % Pt dispersed on the carbon substrate. This catalyst has 2 to 4 times the geometric surface of the pellet type. The solution feed rate is 280 ml min.$^{-1}$ and the pressure is maintained at 4.7 to 5 atmospheres. The percent removal of gold is shown in FIG. 1, which indicates a removal rate of about 95% after the initial start up period, declining to 90% at 340 hours. The catalyst accumulated 22% gold (3.23 Troy oz. Au/lb).

EXAMPLE III

Figure 2:
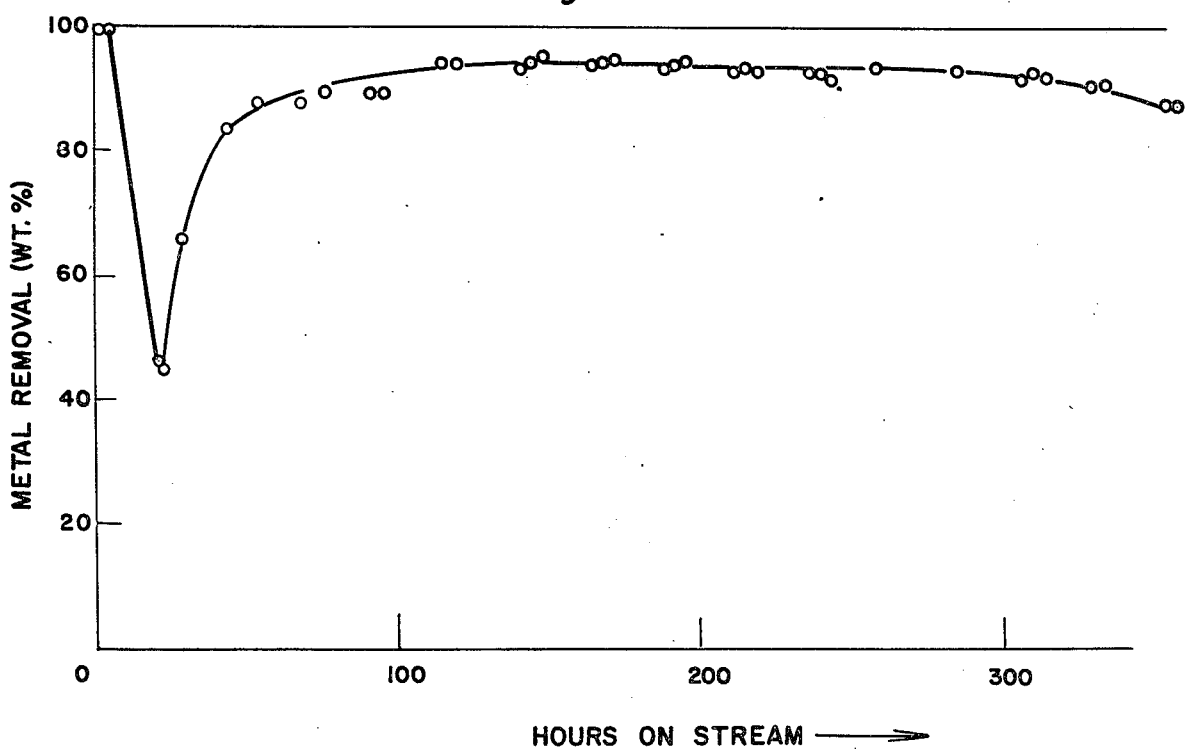

The procedure of Example II is repeated except the catalyst contains 0.90% Pt, solution feed rate is 160 ml-min.$^{-1}$-l$^{-1}$ and the pressure is 2–2.3 atmospheres. The percent removal of gold is shown in FIG. 2, and has an average value of 89.1%. The catalyst accumulated about 13 wt % gold (1.95 Troy oz. Au/lb.), while consuming about 40% of the hydrogen.

EXAMPLE IV

The procedure of Example I is followed except the feedstream is an aqueous copper sulfate solution containing 10 ppm Cu (pH-2.8). The solution feed is maintained at 630 ml-min.$^{-1}$-l$^{-1}$ with a contactor pressure of about 2 atmospheres. The results are shown below:

| Hrs. on Stream | Effluent pH | ppm Cu | $H_2$ Flow Rate Vol. $H_2$/100 Vol. Solid) |
|---|---|---|---|
| 0 | 2.9 | 10 | 23 |
| 1.0 | 2.9 | 5 | 23 |
| 1.25 | — | — | 11 |
| 3.5 | 2.8 | 0 | 11 |
| 6.5 | 2.8 | 0 | 9 |
| 23 | 2.8 | 0 | 9 |
| 50.0 | 2.7 | 0 | 9 |
| 75.3 | 2.7 | 0 | 9 |
| 94.8 | 2.6 | 0 | 9 |
| 98.05 | 2.6 | 0 | 9 |
| 102.55 | 2.6 | 0 | 9 |
| 122.55 | 2.6 | 0 | 9 |
| 145.55 | — | — | 8 |
| 147.55 | 2.6 | 0 | 7 |
| 149.88 | 2.6 | 0 | 7 |
| 150.80 | 2.6 | 0 | 5 |

-continued

| Hrs. on Stream | Effluent pH | ppm Cu | H₂ Flow Rate Vol. H₂/100 Vol. Solid) |
|---|---|---|---|
| 166.8 | 2.6 | 0 | 5 |
| 170 | 2.6 | 0 | 5 |

After 6.5 hours 25% of hydrogen is consumed while maintaining 100% copper removal.

In order to improve catalyst life and loading capacity, a catalytic contactor can be built in sections, to be operatively connected in series or alternating parallel arrangement. Since the concentration of both the metal ion and dissolved hydrogen decrease from the inlet to the outlet of the packed bed, complete removal of the metal requires adequate unspent catalyst adjacent the outlet to provide the minimum number of available active sites for the reduction. By providing a plurality of interconnected bed sections, a section of spent catalyst, loaded with deposited metal and depleted of active sites, can be removed from operation for regeneration or replacement. By sequencing of the fluid handling system, a new section of fresh catalyst can be switched on stream behind an operating section to assure complete removal of metal values.

While the invention has been demonstrated by particular examples, there is no intent to limit the inventive concept except as set forth in the following claims.

What is claimed is:

1. A continuous reduction process for recovering gold or copper from an aqueous solution which comprises:
   co-currently contacting the aqueous solution containing said metal in a reactor at a temperature of 10° to 80°C. with a metal catalyst consisting essentially of 0.02 to 1 Wt % Pt on a porous carbon support in the presence of a stoichiometric excess of hydrogen substantially dissolved in the aqueous solution at a flow rate of up to 1 volume of solution per minute per volume of bed, depositing free metal on the catalyst, and separating the recovered metal from the catalyst.

2. The process of claim 1 further comprising conducting the reduction in a fixed catalyst bed reactor with the solution containing metal values and dissolved hydrogen flowing upwardly through the catalyst bed at ambient temperature.

3. The process of claim 1 wherein the metal catalyst consists essentially of Pt and the aqueous solution contains Cu or Au values in a concentration of about 0.1 to 100 ppm, and further maintaining hydrogen partial pressure at least as great as 1 atmosphere.

* * * * *